(12) United States Patent
Choi et al.

(10) Patent No.: US 8,948,823 B2
(45) Date of Patent: Feb. 3, 2015

(54) MOBILE TERMINAL AND METHOD FOR CONTROLLING THE OPERATION OF THE MOBILE TERMINAL

(75) Inventors: Jinseok Choi, Seoul (KR); Sangmin Shim, Seoul (KR); Jinwoo Lee, Seoul (KR); Hwayoung Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 810 days.

(21) Appl. No.: 13/109,401

(22) Filed: May 17, 2011

(65) Prior Publication Data

US 2011/0287753 A1 Nov. 24, 2011

(30) Foreign Application Priority Data

May 18, 2010 (KR) .......................... 10-2010-0046520

(51) Int. Cl.
*H04M 1/00* (2006.01)
*H04W 52/02* (2009.01)
*H04M 1/725* (2006.01)

(52) U.S. Cl.
CPC ...... *H04W 52/0274* (2013.01); *H04W 52/0254* (2013.01); *H04M 1/72563* (2013.01)
USPC .......................................................... 455/574

(58) Field of Classification Search
USPC .......................................................... 455/574
See application file for complete search history.

(56) References Cited

U.S. PATENT DOCUMENTS

| 7,925,298 | B2 * | 4/2011 | Chen et al. ................. 455/556.1 |
| 8,351,985 | B2 * | 1/2013 | Krishnan et al. ............. 455/557 |
| 2002/0090931 | A1 * | 7/2002 | Papineau et al. ............. 455/411 |
| 2009/0135751 | A1 * | 5/2009 | Hodges et al. ................ 370/311 |
| 2009/0143094 | A1 * | 6/2009 | Shen et al. ................. 455/550.1 |
| 2010/0137035 | A1 * | 6/2010 | Shan et al. .................... 455/566 |
| 2010/0313042 | A1 * | 12/2010 | Shuster ........................ 713/300 |

* cited by examiner

*Primary Examiner* — Marisol Figueroa
(74) *Attorney, Agent, or Firm* — KED & Associates, LLP (57) ABSTRACT

A mobile terminal and a method for controlling the operation of the mobile terminal are provided. In a mobile terminal including a first processor and a second processor, the first processor controls execution of a first operation and displays a screen corresponding to the execution of the first operation on a display module. When a predetermined user command is input, the first processor is deactivated and the second processor performs a control operation for continuously executing the first operation with reference to operation information associated with the first operation and displays a screen corresponding to the continuous execution of the first operation on the display module. The first processor or the second processor is selectively activated according to a user command such that the user can use a phone mode suitable for the environment in which the mobile terminal is used.

14 Claims, 11 Drawing Sheets

| AppList | AP | CP |
|---|---|---|
| Call | O | O |
| Message | O | O |
| Alaram | O | O |
| DMB | O | X |
| PhoneIDLE | O | O |
| • | • | • |
| • | • | • |

MOBILE TERMINAL AND METHOD FOR CONTROLLING THE OPERATION OF THE MOBILE TERMINAL

CROSS-REFERENCE TO RELATED APPLICATION

This application claims the priority benefit of Korean Patent Application No. 10-2010-0046520, filed on May 18, 2010 in the Korean Intellectual Property Office, the disclosure of which is incorporated herein by reference.

BACKGROUND OF THE INVENTION

1. Field of the Invention

The present invention relates to a mobile terminal and a method for controlling the operation of the same, and more particularly to a mobile terminal and a method for controlling the operation of the same, wherein it is possible to selectively provide a smartphone mode or a general phone mode according to user selection.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

As a mobile terminal, a smartphone provides PC-like functions and other advanced functions that cannot be provided by general mobile phones. Thus, the smartphone can be considered a small computer having phone functionality and use thereof is on the rise recently.

A mobile terminal such as a smartphone generally uses both a communication processor that provides basic communication related functions and an application processor that provides other functions. The smartphone activates (or drives) both the communication processor and the application processor when the smartphone is powered on and booted and loads an OS such as Windows Mobile or Linux to provide PC-like or more advanced user interfaces such that various applications can be executed under the OS.

However, such a mobile terminal that uses both the communication processor and the application processor has problems in that it has high power consumption and a long boot time, compared to a general mobile phone which is often referred to as a 'feature phone'.

Accordingly, there is a need to enable a mobile terminal such as a smartphone to provide only a general phone mode, in which only basic communication related functions are provided, according to user selection to minimize power consumption and to achieve faster boot times.

SUMMARY OF THE INVENTION

The present invention to provide a mobile terminal and a method for controlling the operation of the mobile terminal, wherein it is possible to selectively provide a smartphone mode, in which various applications can be executed under an OS booted on the mobile terminal, or a general phone mode, in which only basic communication related functions are provided, according to user selection.

According to an aspect of the present invention, there is provided a method for controlling operation of a mobile terminal including a first processor and a second processor, the method including controlling, by the first processor, execution of a first operation and displaying a screen corresponding to the execution of the first operation on a display module, deactivating the first processor when a predetermined user command is input, and performing, by the second processor, a control operation for continuously executing the first operation with reference to operation information associated with the first operation and displaying a screen corresponding to the continuous execution of the first operation on the display module.

According to another aspect of the present invention, there is provided a method for controlling operation of a mobile terminal including a first processor and a second processor, the method including booting, by the first processor, an operating system when a first key is operated and providing a first user interface through which an application can be executed in an environment of the operation system, and providing, by the second processor, a second user interface through which a communication related function is executable when a second key is operated.

According to another aspect of the present invention, there is provided a mobile terminal including a display module, a first processor configured to control execution of a first operation and to display a screen corresponding to the execution of the first operation on the display module, a second processor configured to deactivate the first processor when a predetermined user command is input, to perform a control operation for continuously executing the first operation with reference to operation information associated with the first operation, and to display a screen corresponding to the continuous execution of the first operation on the display module.

According to another aspect of the present invention, there is provided a mobile terminal including a first key and a second key, a first processor configured to boot an operating system when a first key is operated and to provide a first user interface through which an application can be executed in an environment of the operation system, and a second processor configured to provide a second user interface through which a communication related function is executable when a second key is operated.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The present invention will hereinafter be described in detail with reference to the accompanying drawings in which exemplary embodiments of the invention are shown. Further, the term 'mobile terminal' as used herein may indicate a mobile phone, a smart phone, a laptop computer, a digital broadcast receiver, a personal digital assistant (PDA), a portable multimedia player (PMP), a navigation device, a tablet computer, an electronic book (e-book) reader and the like. In this disclosure, the terms 'module' and 'unit' can be used interchangeably.

Figure 1:
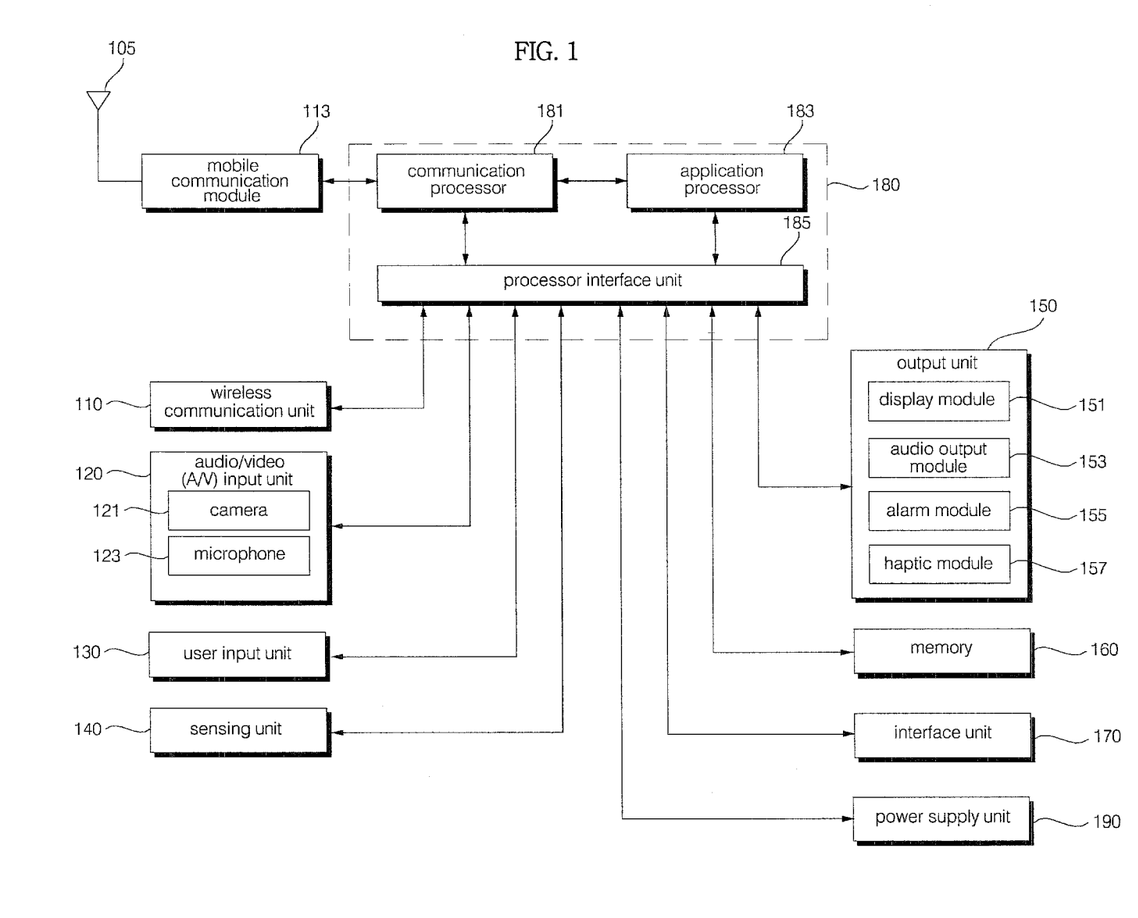
FIG. 1 is a block diagram illustrating a mobile terminal according to an embodiment of the present invention.

First, FIG. 1 is a block diagram illustrating a mobile terminal 100 according to an embodiment of the present invention. Referring to FIG. 1, the mobile terminal 100 includes a mobile communication module 113, a wireless communication unit 110, an audio/video (A/V) input unit 120, a user input unit 130, a sensing unit 140, an output unit 150, a memory 160, an interface unit 170, a controller 180, and a power supply unit 190. In addition, two or more of the elements may be combined into one element, or one element may be divided into two or more elements, if appropriate.

In addition, the mobile communication module 113 can transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

Further, in the embodiment in FIG. 1, the wireless communication unit 110 includes a broadcast reception module (not shown), a wireless Internet module (not shown), a short-range communication module (not shown), and a global positioning system (GPS) module (not shown). The broadcast reception module receives broadcast signals and/or broadcast-related information from an external broadcast management server through a broadcast channel. Further, the broadcast channel may be a satellite channel or a terrestrial channel. Also, the broadcast management server may be a server which generates broadcast signals and/or broadcast-related information and transmits the generated broadcast signals and/or the generated broadcast-related information, or may be a server which receives and then transmits previously-generated broadcast signals and/or previously-generated broadcast-related information.

In addition, the broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. Further, the broadcast-related information may be provided to the mobile terminal 100 through a mobile communication network. In this instance, the broadcast-related information may be received by the mobile communication module 113, rather than by the broadcast reception module. The broadcast-related information may also come in various forms.

In addition, the broadcast reception module can receive broadcast signals using various broadcasting systems such as the digital multimedia broadcasting-terrestrial (DMB-T) system, the digital multimedia broadcasting-satellite (DMB-S) system, the media forward link only (MediaFLO) system, the DVB-H system, and the integrated services digital broadcast-terrestrial (ISDB-T) system. In addition, the broadcast reception module 111 may be suitable not only for the above-mentioned digital broadcasting systems but also for nearly all types of broadcasting systems other than those set forth herein. The broadcast signal and/or the broadcast-related information received by the broadcast reception module can also be stored in the memory 160.

Further, the wireless Internet module corresponds to a module for wirelessly accessing the Internet. The wireless Internet module may also be embedded in the mobile terminal 100 or may be installed in an external device. The wireless Internet module may also use various wireless Internet technologies such as the wireless local area network (WLAN), Wireless Broadband (WiBro), World Interoperability for Microwave Access (Wimax), and High Speed Downlink Packet Access (HSDPA).

In addition, the short-range communication module corresponds to a module for short-range communication and may use various short-range communication techniques such as Bluetooth, radio frequency identification (RFID), infrared data association (IrDA), ultra wideband (UWB), and ZigBee. Further, the GPS module can receive position information from a plurality of GPS satellites. Also, the A/V input unit 120 can be used to receive audio signals or video signals, and in FIG. 1 includes a camera 121 and a microphone 123.

In more detail, the camera 121 processes various image frames such as still images or moving images captured by an image sensor during a video call mode or an image capturing mode. The image frames processed by the camera 121 can also be displayed by a display module 151 included in the output unit 150. Further, the image frames processed by the camera 121 may be stored in the memory 160 or may be transmitted to an external device through the wireless communication unit 110. The mobile terminal 100 may also include two or more cameras 121.

In addition, the microphone 123 can receive external (e.g., voice) sound signals during a call mode, a recording mode, or a voice recognition mode with the use of a microphone and can convert the sound signals into electrical sound data. In the call mode, the mobile communication module 113 converts the electrical sound data into data that can be readily transmitted to a mobile communication base station and then outputs the data obtained by the conversion. The microphone 123 may also use various noise removal algorithms to remove noise that may be generated during the reception of external sound signals.

In addition, the user input unit 130 can generate key input data based on user input for controlling the operation of the mobile terminal 100. The user input unit 130 may be implemented as a keypad, a dome switch, a touch pad (static pressure/static voltage), a jog wheel, a jog switch, etc. In particular, if the user input unit 130 is implemented as a touch pad and forms a mutual layer structure with the display module 151, the user input unit 130 and the display module 151 may be collectively referred to as a touch screen.

Further, the sensing unit 140 determines a current state of the mobile terminal 100 such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 can determine whether the mobile terminal 100 is opened or closed. In addition, the sensing unit 140 can determine whether the mobile terminal 100 is powered by the power supply unit 190 and whether the interface unit 170 is connected to an external device.

Further, in the embodiment in FIG. 1, the sensing unit 140 includes a proximity sensor 141, a pressure sensor 143 and a motion sensor 145. The proximity sensor 141 can detect an approaching object or whether there is an object nearby the mobile terminal 100 without mechanical contact. More specifically, the proximity sensor 141 can detect an approaching object based on a change in an alternating current (AC) magnetic field or a static magnetic field, or the rate of change of capacitance. The sensing unit 140 may also include two or more proximity sensors 141.

In addition, the pressure sensor 143 can determine whether pressure is being applied to the mobile terminal 100 and/or measure the level of pressure, if any, applied to the mobile terminal 100. The pressure sensor 143 may also be installed in a certain part of the mobile terminal 100 where the detection of pressure is needed. For example, the pressure sensor 143 may be installed in the display module 151. In this instance, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

Further, the motion sensor 145 can determine the location and motion of the mobile terminal 100 using an acceleration sensor or a gyro sensor. In more detail, acceleration sensors are a type of device for converting a vibration in acceleration into an electric signal. With recent developments in microelectromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some instances when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate. Further, gyro sensors are sensors for measuring angular velocity, and can determine the relative direction of the rotation of the mobile terminal 100 to a reference direction.

In addition, the output unit 150 can output audio signals, video signals and alarm signals. In the embodiment in FIG. 1, the output unit 150 includes the display module 151, an audio output module 153, an alarm module 155 and a haptic module 157. The display module 151 can display various information processed by the mobile terminal 100. For example, if the mobile terminal 100 is in a call mode, the display module 151 can display a user interface (UI) or a graphic user interface (GUI) for making or receiving a call. If the mobile terminal 100 is in a video call mode or an image capturing mode, the display module 151 can display a UI or a GUI for capturing or receiving images.

Further, if the display module 151 and the user input unit 130 form a mutual layer structure and are thus implemented as a touch screen, the display module 151 can be used as both an output device and an input device. If the display module 151 is implemented as a touch screen, the display module 151 can also include a touch screen panel and a touch screen panel controller. In more detail, the touch screen panel is a transparent panel attached onto the exterior of the mobile terminal 100 and may be connected to an internal bus of the mobile terminal 100.

The touch screen panel keeps monitoring whether the touch screen panel is being touched by the user, and once a touch input to the touch screen panel is received, the touch screen panel transmits a number of signals corresponding to the touch input to the touch screen panel controller. The touch screen panel controller then processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

Further, the display module 151 may include electronic paper (e-paper), which is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules, for example.

In addition, the display module 151 may include at least one of a liquid crystal display (LCD), a thin film transistor (TFT)-LCD, an organic light-emitting diode (OLED), a flexible display, and a three-dimensional (3D) display. The mobile terminal 100 may also include two or more display modules 151. For example, the mobile terminal 100 may include an external display module and an internal display module.

Further, the audio output module 153 can output audio data received by the wireless communication unit 110 during a call reception mode, a call mode, a recording mode, a voice recognition mode, or a broadcast reception mode and/or output audio data present in the memory 160. In addition, the audio output module 153 can output various sound signals associated with the functions of the mobile terminal 100 such as receiving a call or a message. The audio output module 153 may also include a speaker and a buzzer.

Also, the alarm module 155 can output an alarm signal indicating the occurrence of an event in the mobile terminal 100. Examples of the event include receiving a call signal, receiving a message, and receiving a key signal. Examples of the alarm signal output by the alarm module 155 also include an audio signal, a video signal and a vibration signal. More specifically, the alarm module 155 can output an alarm signal upon receiving a call signal or a message. In addition, the alarm module 155 can receive a key signal and output an alarm signal as feedback to the key signal. Therefore, the user can easily recognize the occurrence of an event based on an alarm signal output by the alarm module 155. Further, an alarm signal for notifying the user of the occurrence of an event may be output not only by the alarm module 155, but also by the display module 151 or the audio output module 153.

In addition, the haptic module 157 can provide various haptic effects (such as vibration) that can be perceived by the user. If the haptic module 157 generates vibration as a haptic effect, the intensity and the pattern of vibration generated by the haptic module 157 may be altered in various manners. The haptic module 157 can also synthesize different vibration effects and output the result of the synthesization. Alternatively, the haptic module 157 can sequentially output different vibration effects. Further, the haptic module 157 may provide various haptic effects other than vibration such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may also be configured to enable the user to recognize a haptic effect using the kinesthetic sense of the fingers or the arms. Also, the mobile terminal 100 may include two or more haptic modules 157.

In addition, the memory 160 can store various programs used for the operation of the controller 180, and temporarily store various data such as a list of contacts, messages, still images, or moving images. The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 can also operate a web storage on the Internet, which performs the functions of the memory 160.

Further, the interface unit 170 interfaces with an external device that can be connected to the mobile terminal 100. In more detail, the interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 can also receive data from an external device or be powered by an external device, and transmit data provided by an external device to other components in the mobile terminal 100 or transmit data provided by other components in the mobile terminal 100 to an external device. In addition, when the mobile terminal 100 is connected to an external cradle, the interface unit 170 provides a path for supplying power from the external cradle to the mobile terminal 100 or for transmitting various signals from the external cradle to the mobile terminal 100.

The controller 180 may include a communication processor 181, an application processor 183, and a processor interface unit 185. The communication processor 181 controls the operation of the broadcast reception module 111 and operations associated with basic communication related functions. The application processor 183 may control operations associated with booting of the OS and execution of various applications within the OS environment. When the processor interface unit 185 serves as a passage through which signals are transmitted and received between the communication and application processors 181 and 183 and the components of the mobile terminal 100, the processor interface unit 185 may perform a function to mediate, for example, use of a bus by the communication and application processors 181 and 183.

The controller 180 constructed as described above generally controls the overall operation of the mobile terminal 100 by controlling the operation of each component of the mobile terminal 100. For example, the controller 180 performs control and processing associated with voice communication, data communication, video communication, multimedia playback, and the like.

The power supply unit 190 receives power from an external power source or an internal power source under control of the controller 180 and supplies power required for operation to each component. The power supply unit 190 may also supply power only to selected ones of the components under control of the communication processor 181 or the application processor 183.

The mobile terminal 100 constructed as described above may be constructed so as to be operable in connection with various communication systems, including a wired/wireless communication system and a satellite-based communication system, in which data can be transmitted through frames or packets.

Figure 2:
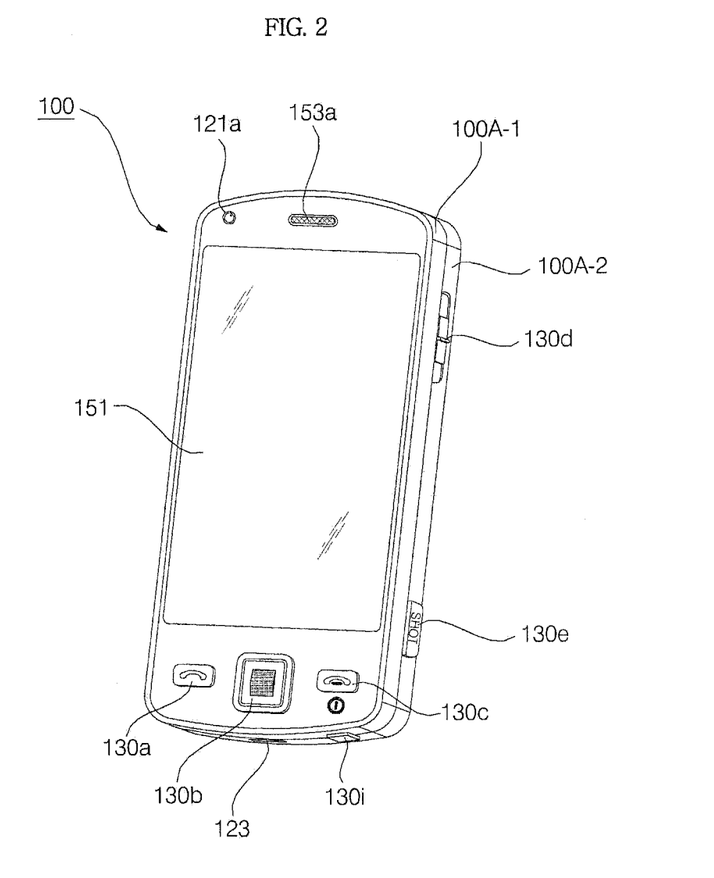
FIG. 2 is a front perspective view of a mobile terminal according to an embodiment of the present invention.
Figure 3:
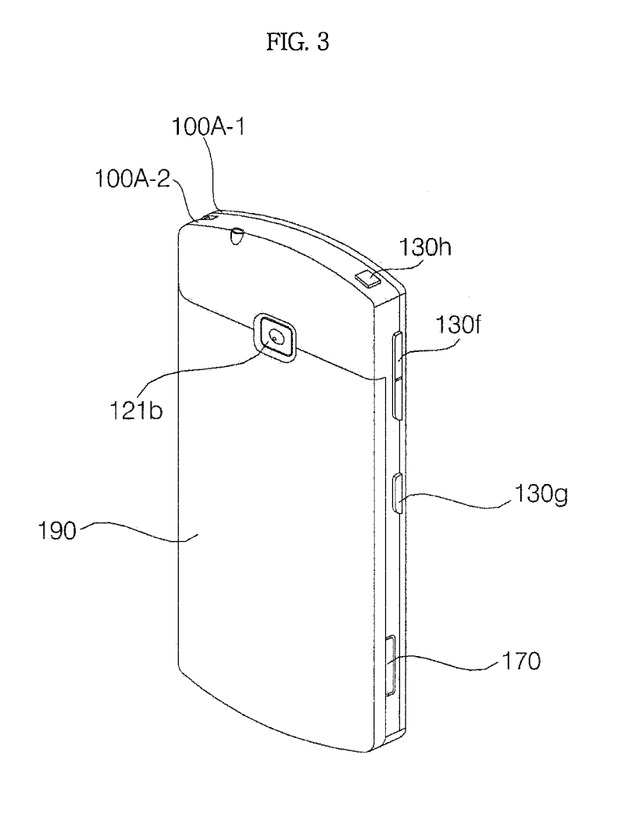
FIG. 3 is a rear perspective view of the mobile terminal shown in FIG. 2.

FIG. 2 is a front perspective view of a mobile terminal according to an embodiment of the present invention and FIG. 3 is a rear perspective view of the mobile terminal shown in FIG. 2. In the following, the mobile terminal according to the present invention is described with reference to FIGS. 2 and 3, from the viewpoint of external components of the mobile terminal. For ease of explanation, the following description will be given with reference to a bar type mobile terminal having a front touch screen as an example among various types of mobile terminals such as folding, bar, swing, and slider types. However, the present invention is not limited to the bar type mobile terminal and can be applied to any type of mobile terminal including the types described above.

As shown in FIGS. 2 and 3, a case defining the external appearance of the mobile terminal 100 includes a front case 100A-1 and a rear case 100A-2. A variety of electronic parts is provided in a space defined within the front and rear cases 100A-1 and 100A-2. The front case 100A-1 and the rear case 100A-2 may be formed through synthetic resin injection molding or may be formed of a metal material such as stainless steel (STS) or titanium (Ti).

The display module 151, a first audio output module 153*a*, a first camera 121*a*, and first to third user input modules 130*a*, 130*b*, and 130*c* may be disposed in the main body of the mobile terminal 100, particularly, in the front case 100A-1. Fourth to ninth user input modules 130*d*, 130*e*, 130*f*, 130*g*, 130*h*, and 130*i* and the microphone 123 may be disposed on the rear case 100A-2.

The display module 151 may include a touchpad formed in a layered structure overlapping the display unit 151 such that the display unit 151 operates as a touch screen allowing the user to input information through touch.

The first audio output module 153*a* may be implemented in a receiver or speaker form. The first camera 121*a* may be implemented to be suitable for capturing a still or moving image of the user or the like. The microphone 123 may be implemented in a form suitable for receiving sound such as user voice.

The first to ninth user input units 130*a*, 130*b*, 130*c*, 130*d*, 130*e*, 130*f*, 130*g*, 130*h*, and 130*i* may be collectively referred to as a "user input unit 130". The user input unit 130 may be of any type, provided that the user input unit 130 is operated in a tactile manner such that it is operated through tactile interaction with the user.

For example, the user input unit 130 may be implemented as a dome switch or a touchpad that can receive a command or information through a push or touch operation by the user. The user input unit 130 may also be implemented as a jog wheel or a joystick. In terms of functionality, the first to third user input units 130a, 130b, and 130c allow the user to input a command such as start, end, or scroll and the fourth user input unit 130d allows the user to select an operating mode of the mobile terminal 100. The fifth to seventh user input units 130e, 130f, and 130g may function as hot keys for activating special functions of the mobile terminal 100. The eighth user input unit 130h may be used as a power on key and the ninth user input unit 130i may be used as a power on key for activating the general phone mode.

A second camera 121b may be additionally provided on a rear surface of the rear case 100A-2. The second camera 121b may have a capture direction substantially opposite to that of the first camera 121a and have a different pixel resolution from that of the first camera 121a. A flash lamp (not shown) and a mirror (not shown) may be additionally provided on the mobile terminal 100 near the second camera 121b. The flash lamp shines light toward a subject when the subject is captured using the second camera 121b. The mirror allows the user to view their face or the like when capturing an image of themselves using the second camera 121b (i.e., in the case of self-shooting).

A second audio output module (not shown) may be additionally provided on the rear case 100A-2. The second audio output module may implement a stereo function in conjunction with the first audio output module 153a and may be used to perform voice or video communication in a speakerphone mode.

The interface unit 170 may serve as a passage for exchanging data with an external device. An antenna for receiving broadcast signals (not shown) in addition to an antenna for communication may be provided on the front case 100A-1 and the rear case 100A-2 at portions thereof. Each antenna may be mounted to be retractable from the rear case 100A-2.

A power supply unit 190 for supplying power to the mobile terminal 100 may be provided on the rear case 100A-2. The power supply unit 190 is, for example, a rechargeable battery which is detachably mounted to the rear case 100A-2 for the purpose of recharging or the like.

Although the above description has been given with reference to an example where the second camera 121b is provided on the rear case 100A-2, the present invention is not limited to this example. When the second camera 121b is not provided, the first camera 121a may be formed to be rotatable so as to enable capturing in the same capture direction as that of the second camera 121b.

Figure 4:
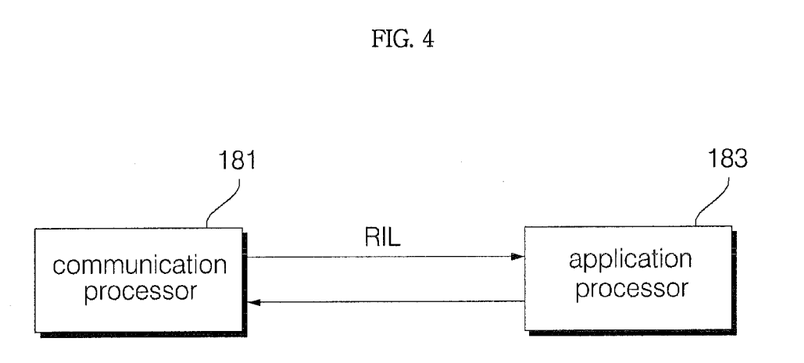
FIG. 4 illustrates operations of a communication processor and an application processor.

FIG. 4 illustrates operations of the communication processor and the application processor. As shown in FIG. 4, the mobile terminal 100 includes the communication processor 181 and the application processor 183. The communication processor 181 controls the broadcast reception module 111 to control operations for providing basic communication related functions through a mobile communication network. The application processor 183 boots the OS and controls operations associated with execution of various applications within the OS environment. That is, the application processor 183 performs a control operation for providing functions other than the basic communication related functions.

The communication processor 181 and the application processor 183 may communicate with each other through a Radio Interface Layer (RIL). For example, when a call or message is received through the broadcast reception module 111, the communication processor 181 may transfer data of the received call or message to the application processor 183 through the RIL.

The RIL is an abstract layer for cellular technologies and provides an interface for connection between cellcore system software and radio hardware. Here, the term "cellcore" refers to a basic concept oriented to wireless connection services and specifically refers to a component that allows communication with a Code Division Multiple Access (CDMA) or Global System for Mobile communication (GSM) module, thus enabling voice or data communication.

Figure 5:
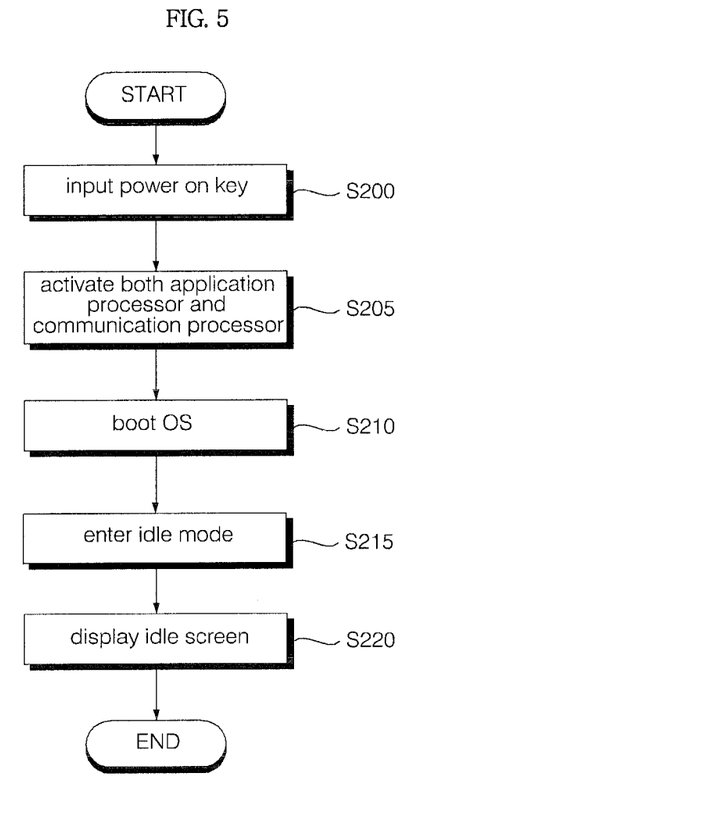
FIG. 5 is a flow chart illustrating a procedure in which the mobile terminal operates when a power on key is input in a method for controlling the operation of the mobile terminal according to an embodiment of the present invention.
Figure 6:
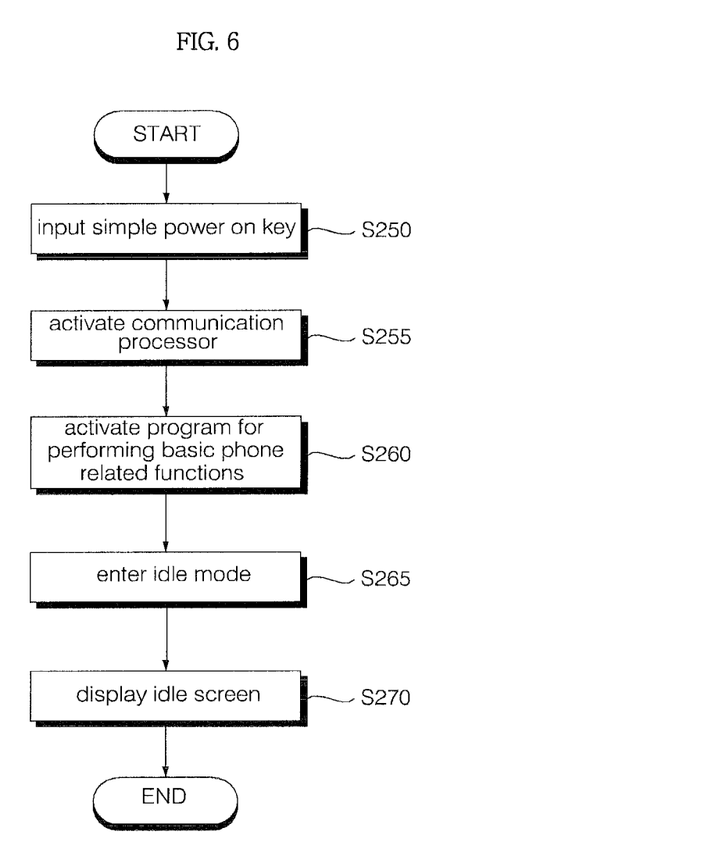
FIG. 6 is a flow chart illustrating a procedure in which the mobile terminal operates when a simple power on key is input in the method for controlling the operation of the mobile terminal according to the embodiment of the present invention.
Figure 7:
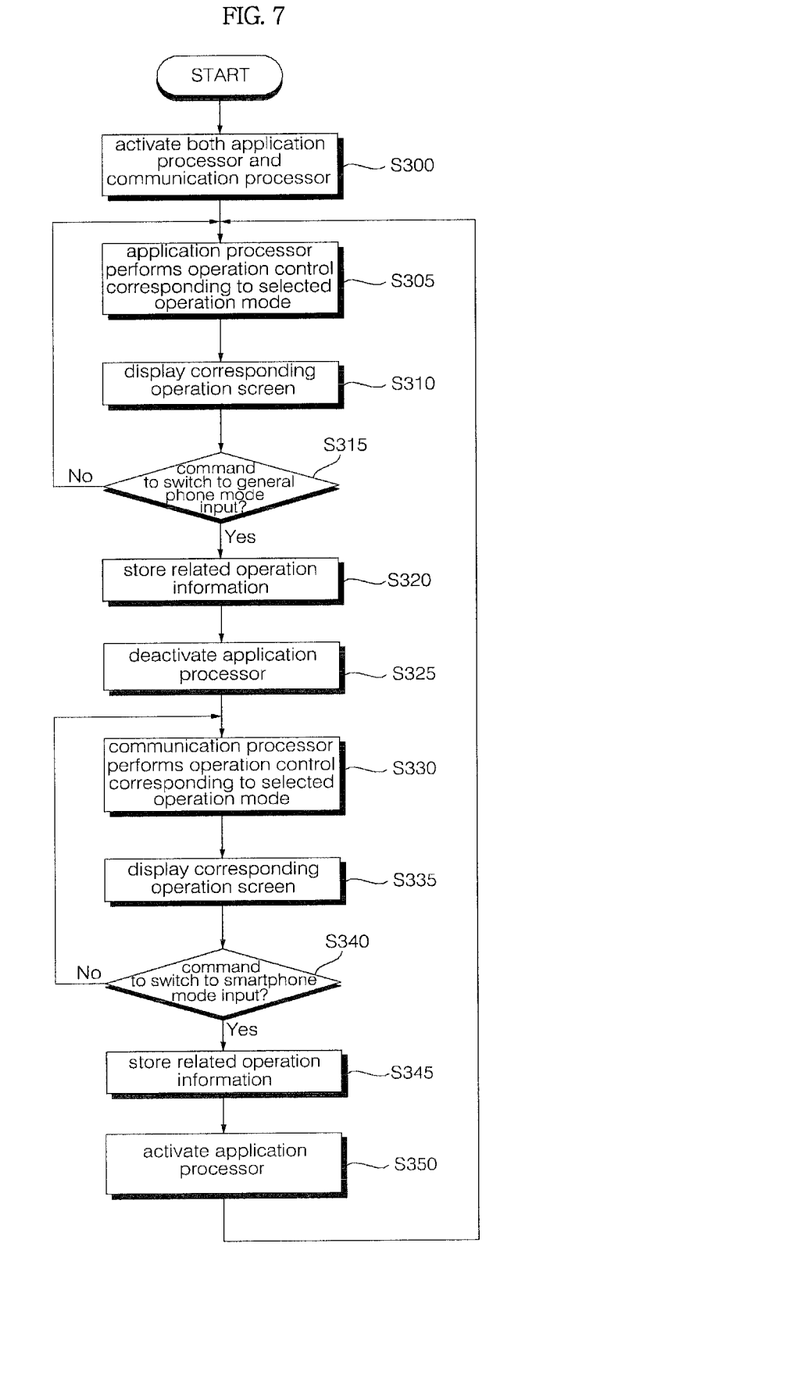
FIG. 7 is a flow chart illustrating a procedure in which activated processors are switched while the mobile terminal is running in the method for controlling the operation of the mobile terminal according to the embodiment of the present invention.

FIGS. 5 to 7 are flow charts illustrating a method for controlling the operation of a mobile terminal according to an embodiment of the present invention. First, FIG. 5 is a flow chart illustrating a procedure in which the mobile terminal 100 operates when a power on key is input in the method for controlling the operation of the mobile terminal according to the embodiment of the present invention.

As shown in FIG. 5, when a power on key, which is configured so as to enable the mobile terminal 100 to be powered on, is input through the user input unit 130 (S200), power is supplied to the communication processor 181 and the application processor 183 to activate (or drive) both the communication processor 181 and the application processor 183 (S205). The application processor 183 performs a boot process according to a booting program stored in the memory 160 to boot an OS such as Windows Mobile, Linux, or Symbian (S210).

After the OS finishes booting, various applications may be executed within the OS environment. Smartphones can execute various applications within the OS environment and thus can provide various PC-like functions.

Upon completion of the OS boot process, the application processor 183 controls the mobile terminal 100 to enter an idle mode (S215) and an idle screen is displayed on the display module 151 upon entering the idle mode (S220). The mobile terminal 100 may also be set such that the mobile terminal 100 enters a locked mode upon completion of the OS boot process and displays an idle screen after the locked mode is released.

The display module 151 may be turned off when a predetermined time has elapsed without key input so as to conserve power and may be turned on to display an idle screen upon receiving a key input through the user input unit 130 or the like.

When the user inputs a key, which has been set by default so as to enable the mobile terminal 100 to be powered on, to boot the mobile terminal 100, both the communication processor 181 and the application processor 183 are activated to load the OS to allow the mobile terminal 100 to be used as a smartphone that provides powerful PC-like capabilities.

FIG. 6 is a flow chart illustrating a procedure in which the mobile terminal operates when a simple power on key is input in the method for controlling the operation of the mobile terminal according to an embodiment of the present invention.

As shown in FIG. 6, when a simple power on key, which is configured so as to drive the mobile terminal 100 in a general phone mode, is input through the user input unit 130 (S250), power is supplied to the communication processor 181 while no power is supplied to the application processor 183 to activate only the communication processor 181 (S255). Here, required peripheral devices such as the display module 151 and a keypad are also activated.

When only the communication processor 181 is activated, the OS is not loaded and the communication processor 181 activates a program for performing basic communication related functions such as phone communication, message transmission/reception, and phonebook search through the communication processor 181 (S260). The activated program provides an environment capable of executing only a basic set of applications for performing basic communication related functions. The communication processor 181 controls the mobile terminal 100 to enter an idle mode (S265) and an idle screen is displayed on the display module 151 upon entering the idle mode (S270).

Data, images, etc., for constructing a user interface and a program for driving a basic set of applications when only the communication processor 181 is activated may be stored separately from the OS when the mobile terminal 100 is manufactured.

When only the communication processor 181 is activated, power consumption is reduced since the application processor 183 is not activated and boot time is decreased since the OS does not need to be loaded. This phone mode can be effectively used in a situation in which it is difficult to charge the mobile terminal 100.

FIG. 7 is a flow chart illustrating a procedure in which activated processors are switched while the mobile terminal is running in the method for controlling the operation of the mobile terminal according to the embodiment of the present invention.

As shown in FIG. 7, while both the communication processor 181 and the application processor 183 are running (S300), the application processor 183 performs operation control corresponding to an operation mode selected according to a user command or the like (S305). The application processor 183 displays an operation screen corresponding to execution of operation control in the current operation mode on the display module 151 (S310). Here, examples of the operation screen include an idle screen, a message reception screen, a message sending screen, a main menu screen, a multimedia playback screen, an image or text viewer screen, a broadcast screen, a map screen, and a webpage screen.

Then, it is determined whether or not a command to switch to the general phone mode has been input in this state (S315). If it is determined that a command to switch to the general phone mode has not been input (S315), the procedure subsequent to step S305 is repeated. That is, the mobile terminal 100 operates in a smartphone mode.

On the other hand, if it is determined that a command to switch to the general phone mode has been input according to a simple power on key, a menu item selected on the operation screen, or the like (S315), the application processor 183 stores operation information associated with the current operation mode in the memory 160 at a preset location thereof. After storing the operation information, the application processor 183 notifies the communication processor 181 of phone mode switching. This allows the communication processor 181 to deactivate the application processor 183 (S325).

The communication processor 181 continuously performs the operation control corresponding to the operation mode, which has been performed by the application processor 183, with reference to the operation information stored by the application processor 183 (S330). The communication processor 181 displays the operation screen corresponding to execution of the current operation mode on the display module 151 (S335).

Then, it is determined whether or not a command to switch to the smartphone mode has been input (S340). If it is determined that a command to switch to the smartphone mode has not been input (S340), the procedure subsequent to step S330 is repeated. That is, the mobile terminal 100 operates in the general phone mode.

On the other hand, if it is determined that a command to switch to the smartphone mode has been input (S340), the communication processor 181 stores operation information associated with the current operation mode in the memory 160 at a preset location thereof (S345). Then, the application processor 183 is reactivated (S350) and the procedure subsequent to step S305 is performed.

Through the above procedure, it is possible to deactivate the application processor 183 such that only the communication processor 181 is activated even when the mobile terminal 100 is running. It is also possible to additionally activate the application processor 183 when only the communication processor 181 is running.

FIGS. 8 to 12 illustrate a procedure in which activated processors are switched while the mobile terminal is running according to an embodiment of the present invention.

Figure 8:
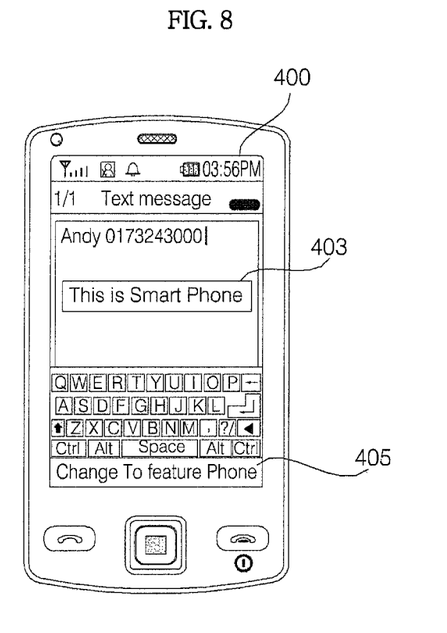
FIGS. 8 to 12 illustrate a procedure in which activated processors are switched while the mobile terminal is running according to the embodiment of the present invention.

FIG. 8 illustrates a message composition screen as an exemplary operation screen displayed when the application processor is running. A message 403 indicating the current phone mode (the smartphone mode in the example of FIG. 8) may be displayed on an operation screen such as the message composition screen 400 according to a user command. In the case where the current operation mode is an operation mode such as a message composition mode that is also executable by the communication processor 181, a menu item 405 which enables the user to select the feature phone mode, i.e., the general phone mode, may be displayed on the message composition screen 400.

Figure 9:
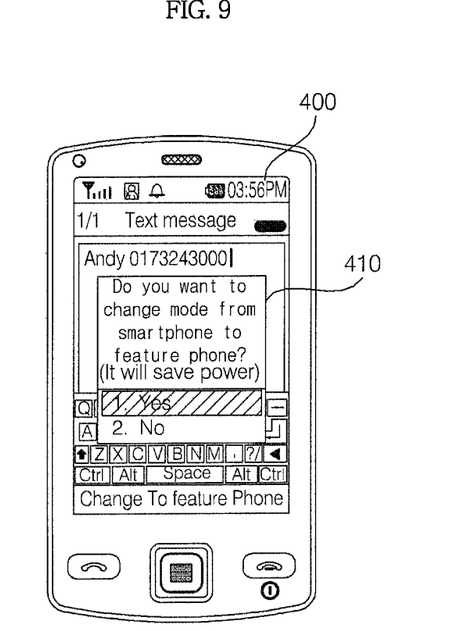

FIG. 9 illustrates a message composition screen 400 on which a phone mode switching menu 410, which enables the user to switch phone modes, is displayed when the user has selected the menu item 405, which enables the user to select the general phone mode, on the message composition screen 400. When the user has selected '1. Yes' on the phone mode switching menu 410, the application processor 183 stores operation information associated with the current operation mode, the current operation states, and the like in a file format such as 'CurrentAppState.xml' in the memory 160 at a preset location thereof and requests the communication processor 181 to switch the phone mode to the general phone mode after deactivating the OS.

Figure 10:
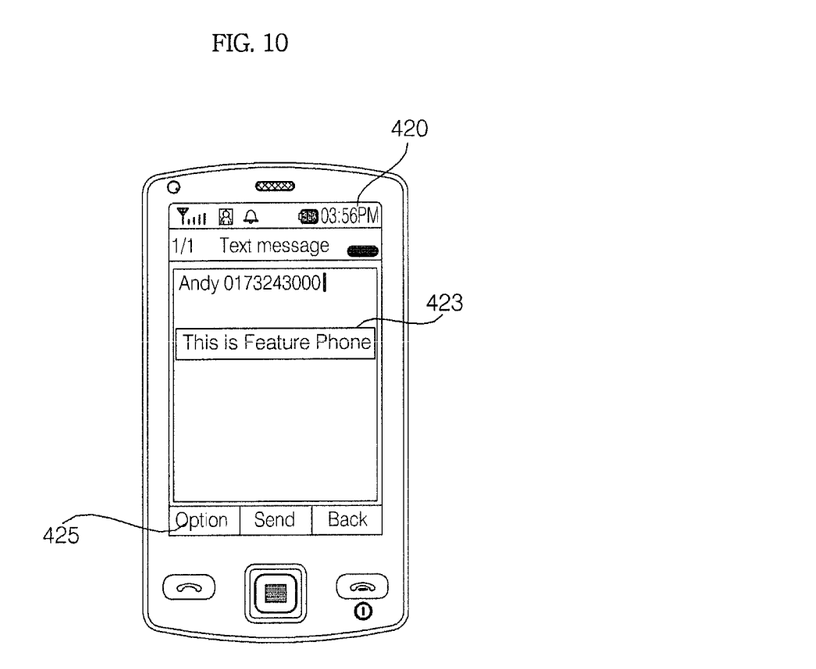

FIG. 10 illustrates an exemplary message composition screen that is displayed as the communication processor is activated. Upon receiving a phone mode switching request from the application processor 183, the communication processor 181 performs a control operation for continuously performing the previous operation mode, i.e., the message composition mode, with reference to the associated operation information in the 'CurrentAppState.xml' file stored in the preset location of the memory 160.

A message 423 indicating the current phone mode may also be displayed on a message composition screen 420 provided by the communication processor 181 according to a user command. The user may also select an option menu item 425 to switch phone modes.

When the phone mode has been switched to the general phone mode as the communication processor 181 is activated, the operation screen may be switched from a color screen to a monochrome screen or a text input interface may be changed from a touch-based input interface to a key-based input interface. However, the user can continue to perform a task that was being performed when the phone mode was switched.

Figure 11:
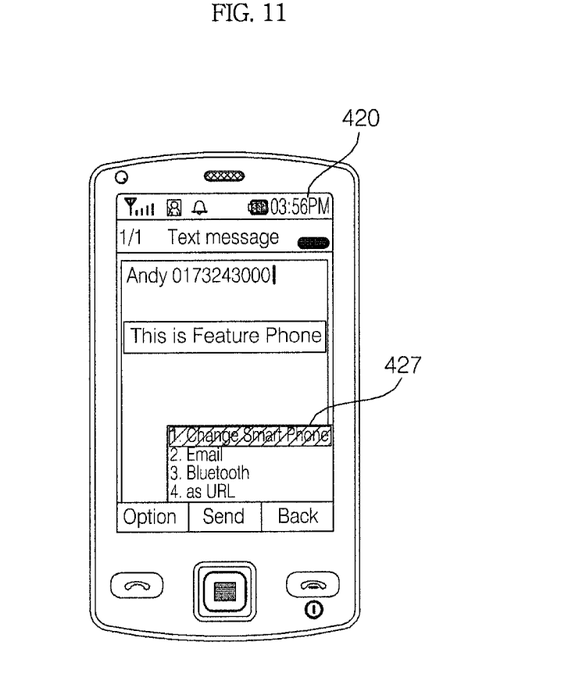
Figure 12:
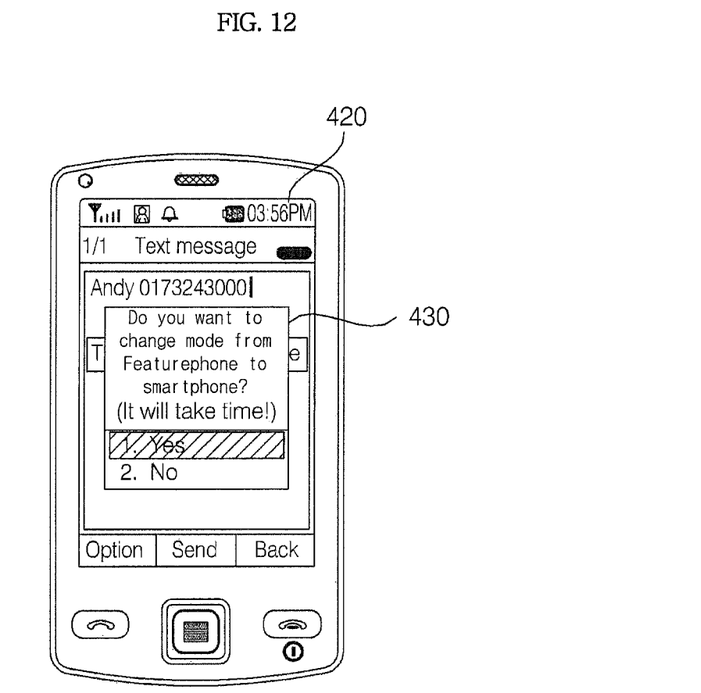

FIG. 11 illustrates a message composition screen 420 on which a popup menu 427 is displayed upon selection of the option menu 425. When a 'Change SmartPhone' item is selected on the popup menu 427, a phone mode switching menu 430 is displayed as shown in FIG. 12 and, when '1.Yes' is selected on the phone mode switching menu 430, the application processor 183 is reactivated to switch the phone mode to the smartphone mode.

Also in this case, the communication processor 181 stores operation information associated with the current operation mode, the current operation states, and the like in a file 'CurrentAppState.xml' and terminates a user interface associated with the communication processor 181. Then, when power is again supplied to the application processor 183 to boot the OS, the application processor 183 may perform a control operation for continuously performing the previous operation mode with reference to the operation information stored in the 'CurrentAppState.xml' file.

Through the above procedure, it is possible to continuously perform an operation even when phone modes are switched as activated processors are switched during the operation.

Figure 13:
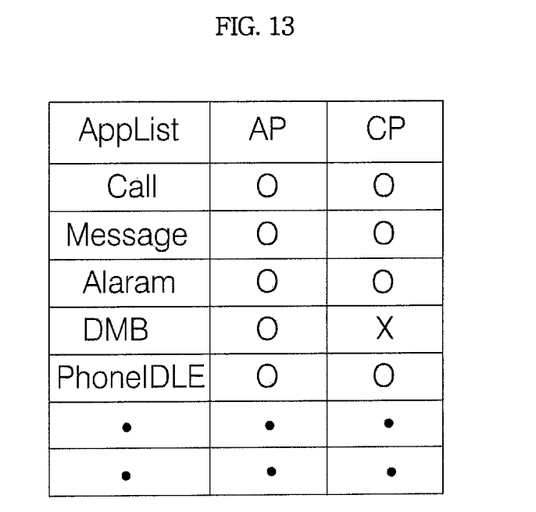
FIG. 13 illustrates an exemplary application list.

To switch phone modes, whether or not the current operation mode allows phone mode switching should be determined beforehand. An application list shown in FIG. 13 may be used for such determination. In the application list, items denoted by 'AP' indicate that the application processor 183 can execute corresponding applications and items denoted by 'CP' indicate that the communication processor 181 can execute corresponding applications. Upon determining that the current operation mode allows phone mode switching with reference to the application list, a menu associated with phone mode switching may be displayed.

The method for controlling the operation of a mobile terminal according to the present invention can be embodied as processor readable code stored in a processor readable medium provided in the mobile terminal. The processor readable medium includes any type of storage device that stores data which can be read by a processor. Examples of the processor readable medium include Read-Only Memory (ROM), Random-Access Memory (RAM), CD-ROMs, magnetic tapes, floppy disks, optical data storage devices, and so on. The processor readable medium can also be embodied in the form of carrier waves such as signals transmitted over the Internet. The processor readable medium can also be distributed over a network of coupled processor systems so that the processor readable code is stored and executed in a distributed fashion.

As is apparent from the above description, a mobile terminal and a method for controlling the operation of the same according to the present invention have a variety of advantages. For example, it is possible to selectively provide a smartphone mode, in which various applications can be executed under an OS booted on the mobile terminal, or a general phone mode, in which only basic communication related functions such as phone communication, message transmission/reception, phonebook search, and alarm are provided, according to user selection. This allows the user to select and use a phone mode suitable for an environment in which the mobile terminal is used.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A method for controlling operation of a mobile terminal equipped with a controller including an application processor and a communication processor, the method comprising:
    entering, by the controller, the mobile terminal in a smart phone mode and activating the application and communication processors when the mobile terminal is powered on;
    controlling, by the application processor, execution of a first operation and displaying a screen corresponding to the execution of the first operation on a display module; and
    changing, by the controller, an operation mode of the mobile terminal from the smart phone mode to a general phone mode when a predetermined user command is input,
        wherein the changing the operation mode further comprises
        storing, by the application processor, operation information associated with the first operation in a memory,
        deactivating, by the communication processor, the application processor, and
        performing, by the communication processor, a control operation for continuously executing the first operation with reference to the operation information stored in the memory and displaying a screen corresponding to the continuous execution of the first operation on the display module.

2. The method according to claim 1, wherein the smart phone mode is an operation mode in which various applications can be executed under an operating system (OS) booted on the mobile terminal, and the general phone mode is an operation mode in which only basic communication related functions are provided.

3. The method according to claim 1, wherein the predetermined user command is input when a specific key provided on a body of the mobile terminal is operated.

4. The method according to claim 1, wherein the specific user command is input when a specific menu item is selected on a screen displayed on the display module.

5. The method according to claim 1, wherein the first operation is associated with at least one of operation modes including a communication mode, a message transmission/reception mode, a phonebook search mode, and an alarm mode.

6. The method according to claim 1, further comprising displaying information indicating a currently running one of the application and communication processors.

7. The method according to claim 1, wherein the entering the mobile terminal in the smart phone mode further comprises:
    entering, by the controller, the mobile terminal in a smart phone mode and activating the application and communication processors when a first power on key is operated; and
    booting, by the application processor, an operating system and providing a first user interface through which an application can be executed in an environment of the operation system when the mobile terminal enters the smart phone mode in response to an operation of the first power on key.

8. The method according to claim 7, further comprising:
    entering, by the controller, the mobile terminal in a general phone mode activating the communication processor and deactivating the application processor when a second power key is operated; and activating, by the communication processor, a program for performing basic communication related functions and providing a second user interface through which a communication related function is executable when the mobile terminal enters the general phone mode in response to an operation of the second power on key.

9. The method according to claim 8, wherein the communication related function includes a voice communication function, a message transmission/reception function, a phonebook search function, and an alarm function.

10. A mobile terminal comprising:
a display module;
a controller including an application processor and a communication processor, the controller configured to enter the mobile terminal in a smart phone mode and activate the application and communication processors when the mobile terminal is powered on, and further configured to change an operation mode of the mobile terminal from the smart phone mode to a general phone mode when a predetermined user command is input;
the application processor configured to control executing of a first operation and to display a screen corresponding to the execution of the first operation on the display module, and further configured to store operation information associated with the first operation in a memory when the predetermined user command is input; and
the communication processor configured to deactivate the application processor, to perform a control operation for continuously executing the first operation with reference to operation information associated with the first operation, and to display a screen corresponding to the continuous execution of the first operation on the display module when the predetermined user command is input.

11. The mobile terminal according to claim 10, wherein the smart phone mode is an operation mode in which various applications can be executed under an operating system (OS) booted on the mobile terminal, and the general phone mode is an operation mode in which only basic communication related functions are provided.

12. The mobile terminal according to claim 10, wherein the application processor and the communication processor communicate with each other through a Radio Interface Layer (RIL).

13. The mobile terminal according to claim 8, further comprising:
a first power on key for entering in a smart phone mode; and
a second power on key for entering in a general phone mode,
wherein, when the first power on key is operated, the controller is configured to enter the mobile terminal in the smart phone mode and activate the application and communication processors, and
the application processor is configured to boot an operating system and to provide a first user interface through which an application can be executed in an environment of the operation system.

14. The mobile terminal according to claim 13, wherein, when the second power on key is operated, the controller is configured to enter the mobile terminal in the general phone mode, activate the communication processor and deactivate the application processor, and
the communication processor is configured to activate a program for performing basic communication related functions and provide a second user interface through which a communication related function is executable.

* * * * *